United States Patent
Stephan et al.

(10) Patent No.: US 6,175,173 B1
(45) Date of Patent: Jan. 16, 2001

(54) TUBE PUMP

(75) Inventors: Waldemar Stephan, Dortmund; Hansjürgen Kech, Herdecke; Albert Genster, Marl, all of (DE)

(73) Assignee: Wilo GmbH, Dortmund (DE)

(*) Notice: Under 35 U.S.C. 154(b), the term of this patent shall be extended for 0 days.

(21) Appl. No.: 09/396,114

(22) Filed: Sep. 14, 1999

(30) Foreign Application Priority Data

Sep. 15, 1998 (DE) .............................. 198 42 168
Sep. 15, 1998 (DE) .............................. 198 42 169

(51) Int. Cl.[7] .................................................. H02K 5/10
(52) U.S. Cl. .......................... 310/87; 417/356; 417/357
(58) Field of Search ................... 310/87, 63, 54; 417/366, 356, 369, 357, 423.3

(56) References Cited

U.S. PATENT DOCUMENTS

| 1,787,562 | * | 1/1931 | Barlow | 123/41.03 |
|---|---|---|---|---|
| 2,506,827 | * | 5/1950 | Goodner | 417/421 |
| 2,520,880 | * | 8/1950 | Harlamoff . | |
| 2,968,249 | * | 1/1961 | Caine et al. . | |
| 3,211,935 | * | 10/1965 | Sones | 310/87 |
| 3,294,025 | * | 12/1966 | Niemeyer et al. | 210/416.4 |
| 3,826,595 | | 7/1974 | Bottoms | 417/370 |
| 4,213,745 | * | 7/1980 | Roberts | 417/363 |
| 4,492,889 | * | 1/1985 | Fukushi et al. | 310/87 |
| 4,768,931 | * | 9/1988 | Iwai et al. | 417/366 |
| 4,955,431 | * | 9/1990 | Saur et al. | 165/271 |
| 4,998,865 | * | 3/1991 | Nakanishi et al. | 417/423.7 |
| 5,332,369 | * | 7/1994 | Jensen | 417/369 |
| 5,401,146 | * | 3/1995 | Moriya et al. | 417/423.14 |
| 5,478,215 | * | 12/1995 | Kobayashi et al. | 417/423.14 |
| 5,494,403 | * | 2/1996 | Kobayashi . | |
| 5,494,413 | * | 2/1996 | Campen et al. | 417/356 |
| 5,674,056 | | 10/1997 | Yamamoto et al. | 417/366 |
| 5,997,261 | * | 12/1999 | Kershaw et al. | 417/336 |

FOREIGN PATENT DOCUMENTS

| 38 22 897A1 | | 1/1990 | (DE) . |
| 196 46 617A1 | | 5/1998 | (DE) . |
| 2 722 834 | * | 1/1996 | (FR) . |

* cited by examiner

Primary Examiner—Nestor Ramirez
Assistant Examiner—Joseph Waks
(74) Attorney, Agent, or Firm—Herbert Dubno

(57) ABSTRACT

A centrifugal pump has a housing with intake and discharge fittings at axially opposite ends. The electronic motor is supported on ribs within the pump housing and the motor casing is closed by the electronic control circuit for the motor which seals the motor against the pump liquid. The coolant thus flows around the electric motor and its control circuit.

11 Claims, 3 Drawing Sheets

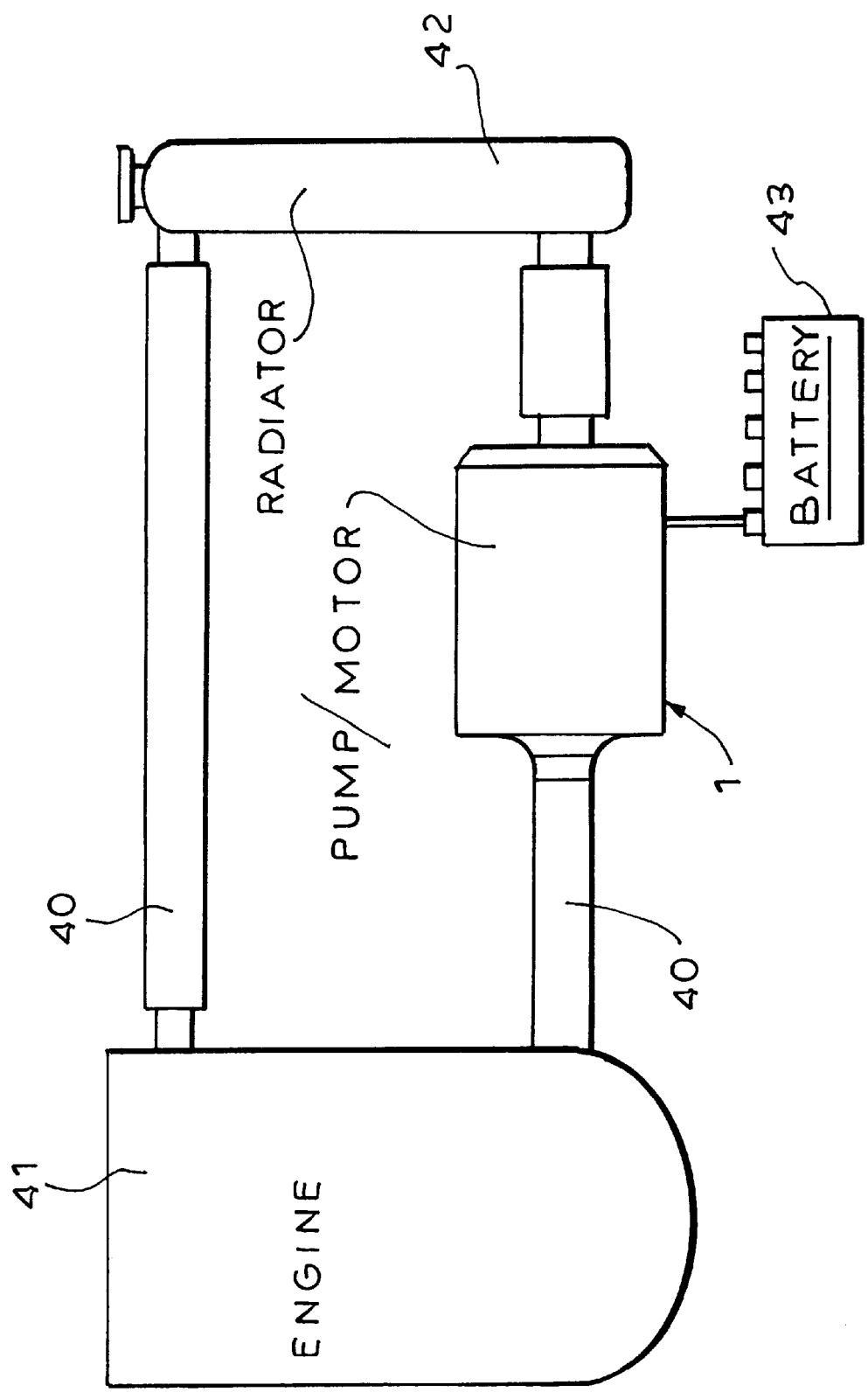

TUBE PUMP

FIELD OF THE INVENTION

The present invention relates to a centrifugal pump and, more particularly, to a pump which can be built into a pipe system and which fully contains the electric motor between the pump intake and discharge fittings.

BACKGROUND OF THE INVENTION

In-line pumps which comprise a pump housing through which a liquid is displaced by the rotation of an impeller within the housing by an electric motor fully contained therein and which have intake and outlet fittings at opposite ends of the pump housing are known. The motor is supported within the pump housing by a plurality of ribs and the liquid flows around the electric motor and thus serves as a coolant for the electric motor.

Such pumps are also known as tube pumps and the electric motors of such pumps are generally provided with electric controllers which are located externally of the pump housing. The electric controls thus require separate or additional housings and additional space which often may not be readily available. Where the electric circuitry generates heat, it may be necessary to provide separate cooling.

When it is desirable to use an in-line or tube pump of this type in a motor vehicle, these factors may be of considerable significance and may militate against use of a tube pump.

OBJECTS OF THE INVENTION

It is, therefore, the principal object of the present invention to provide a structurally simple, economical and easily handled and used centrifugal pump which has small external dimensions, light weight and efficient cooling of all parts associated with the pump including the electronic control circuitry.

Another object of the invention is to provide an in-line or tube pump which eliminates the drawbacks outlined above.

SUMMARY OF THE INVENTION

These objects and others which will become apparent hereinafter are attained, in accordance with the invention, in a centrifugal pump which comprises:

- an elongated tubular pump housing formed with an intake fitting at one axial end and a discharge fitting at an opposite axial end;
- a pump impeller rotatable in the housing about an axis thereof for drawing liquid in through the intake fitting, passing the liquid axially through the housing and discharging the liquid through the discharge fitting;
- an axially elongated electric motor wholly received in the housing between the intake fitting and the discharge fitting and flushed around by the liquid flowing between the intake fitting and the discharge fitting, the motor having a rotor rotatable about the axis and operatively connected to the impeller, a stator surrounding the rotor and provided with at least one winding, and a motor casing receiving the stator and spaced inwardly of the housing, whereby the liquid passes between the casing and the housing;
- an electronic control unit for controlling the motor, wholly received in the housing and flushed around by the liquid; and
- a plurality of angularly spaced support ribs between the housing and the casing for supporting the casing in the housing.

More particularly, the centrifugal pump of the invention contains an electric motor which is disposed entirely within the pump housing which is of the in-line type having axial inlet and discharge fittings at opposite ends thereof and in which the electric motor is supported within the pump housing at a spacing from the inner wall thereof by the support ribs. With the system of the invention, the electric control unit itself is in the form of a disk which closes the motor casing and is completely within the pump housing so that the liquid displaced by the pump flushes past that control unit.

With the system of the invention, a separate housing externally of the pump housing for the control unit is eliminated, the pump has small dimensions overall, is of light weight and has effective cooling both of the motor and of the control unit. Additional systems for cooling the electric circuitry are avoided.

The electric motor is preferably an electrically commutated brush-free direct current motor although it can also be configured as an alternating current motor in which the electric control circuitry can, for example, include a converter. The electric control circuitry can include a circuit board with a microprocessor controller, power transistors and the like.

It has been found to be especially advantageous to provide the electric control unit as a plug for an open end of the motor casing at the side thereof opposite the impeller. A single seal may be provided between the electronic control unit and the casing and can serve as the only seal for the latter. This eliminates the need for multiple seals and separate casing covers, thereby affording a further saving with respect to size and weight.

Advantageously, the motor is a so-called canned motor in which the motor can lining the inside of the stator and surrounding the rotor can be in one piece with the casing.

The cable for connection to the electric control unit can extend into the latter through one of the holding ribs and a plug connection can be provided for the conductors in a fitting on the pump housing. The conductors extending to the electric control unit are thus appropriately protected.

The in-line centrifugal pump of the invention, because of its narrow configuration, can be used highly effectively as a coolant pump for the internal combustion engine of a motor vehicle and hence in the motor vehicle coolant system.

It has long been known that the coolant in the circulation of a water cooled internal combustion engine can be circulated by a pump. In general, that pump is driven by a belt drive from the crank shaft of the internal combustion engine itself. More recently, however, it has been found to be advantageous to drive the water pump by a separate electric motor to be able to better control and regulate the cooling effectiveness.

In this case, the electric motor constitutes a component which must be accommodated in the engine compartment of the motor vehicle. In modern automotive vehicles, space is either not available in the engine compartment or is available so limitedly as to cause problems for the additional electric motor.

In addition, the high temperatures in the engine compartment make the cooling of the electronic circuitry of the electric motor especially important.

The invention accommodates the electric control circuitry directly within the housing of an in-line pump so that the pump itself is merely an extension of the piping of the coolant circulation. The pump is thus accommodated in a space-saving manner and, because the electronic controlled circuitry is located within the pump housing, cooling of the circuitry is simplified. The pump may also be accommodated within a container of the coolant circulation system, for example, a surge container or reservoir.

According to another feature of the invention, the noise generated by the pump is damped by the circulation of the liquid through the pump. It has been found to be especially advantageous to form the pump housing as a part of the piping for the circulation system so that the pump with the electronic motor and the electronic controlled unit are all completely received within the piping of the coolant circulation. The piping in the region of the pump will only have an increase in the pipe diameter. Special space for the pump and its electric controlled unit is not required.

When the pump is located in a surge vessel of the cooling circulation, that vessel may be dimensioned sufficiently so that the pump and its motor are fully contained within that container. This insures an especially effective cooling of the pump electronics.

It is also advantageous to mount the pump releasably in the surge container, i.e. so that it can be easily removed and inserted. This facilitates mounting and dismounting, e.g. for maintenance.

BRIEF DESCRIPTION OF THE DRAWING

The above and other objects, features, and advantages will become more readily apparent from the following description, reference being made to the accompanying drawing in which:

FIG. 3 is a diagram showing the pump in a motor vehicle coolant circulation system.

SPECIFIC DESCRIPTION

Figure 1:
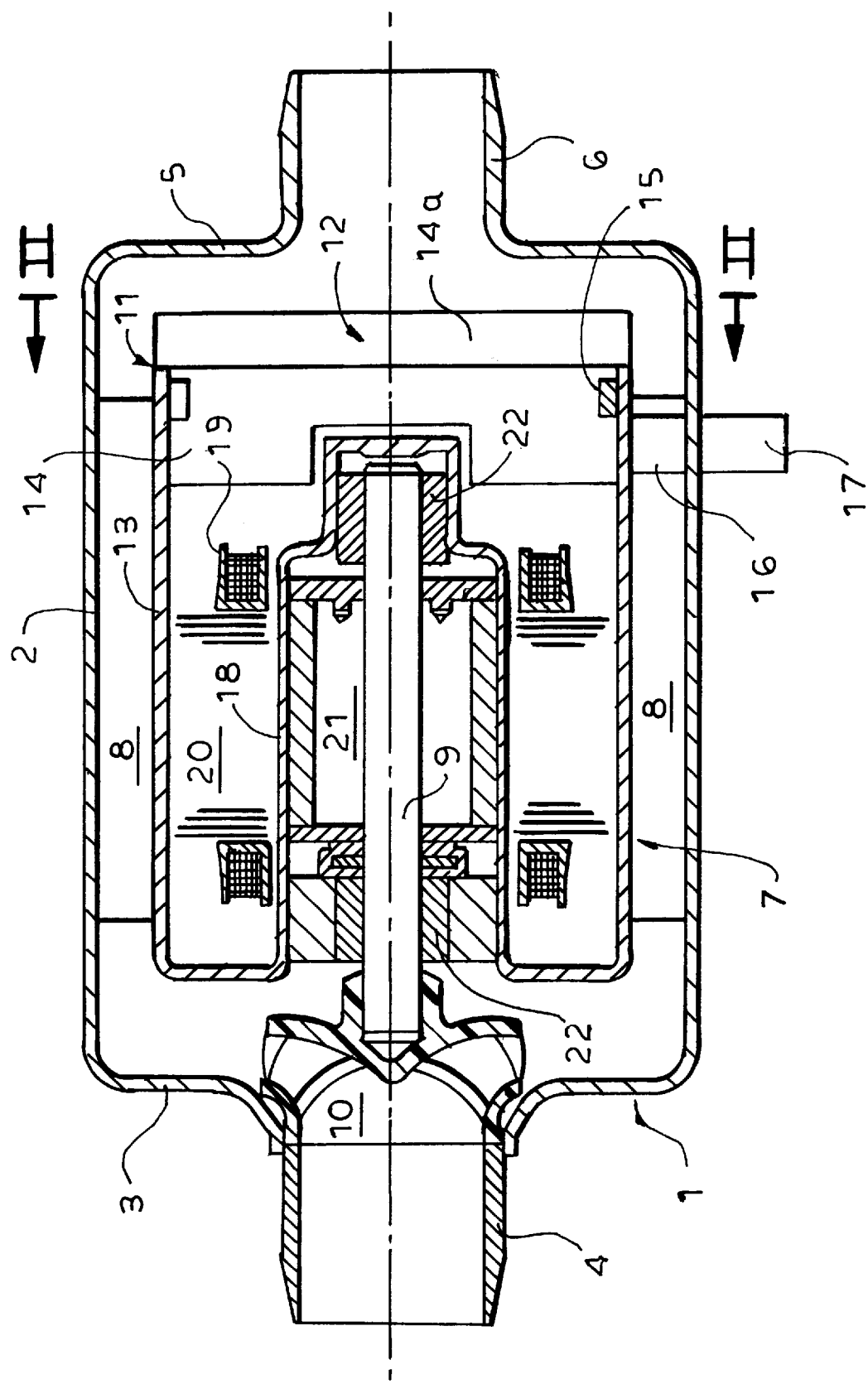
FIG. 1 is an axial cross section through a pump according to the invention.

The centrifugal circulating pump 1 shown in the drawing comprises a cylindrical pump housing 2 which is formed at one end 3 with an intake fitting 4 and at the opposite end 5 with a discharge fitting 6. Disposed centrally within the housing 2 and coaxially therewith is an electric motor 7 which is supported on ribs 8 and which has a shaft 9 connected to and driving the impeller 10. The latter is located directly downstream of the intake fitting 4. The intake fitting 4 and the discharge fitting 6 are coaxial with the shaft 9.

The end 11 of the motor casing 13 opposite the side of the motor on which the impeller 10 is provided receives an electric control unit 12 which is formed as a stepped disk with the small diameter step 14 received within the casing 13 and plugging the latter. The electric control unit has a large diameter step 14a which is flush with the outer surface of the casing 13. A single sealing ring 15 in a groove of the step 14 seals the interior of the casing 13 against the liquid which is displaced. Further seals are not required. The cable 16 running to the electronic control unit 12 can extend through one of the support ribs 8 and can terminate in a plug 17 at the exterior of the pump housing 2.

Figure 4:
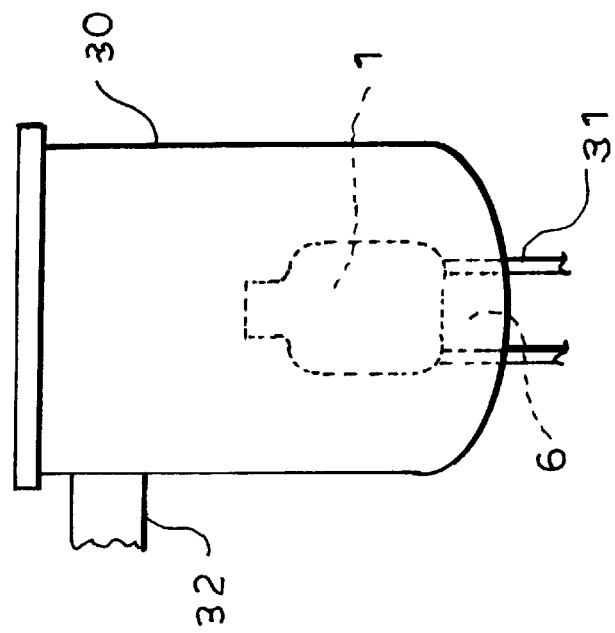
FIG. 4 is a diagram of a surge tank of another motor vehicle coolant system provided with the pump of the invention.
Figure 2:
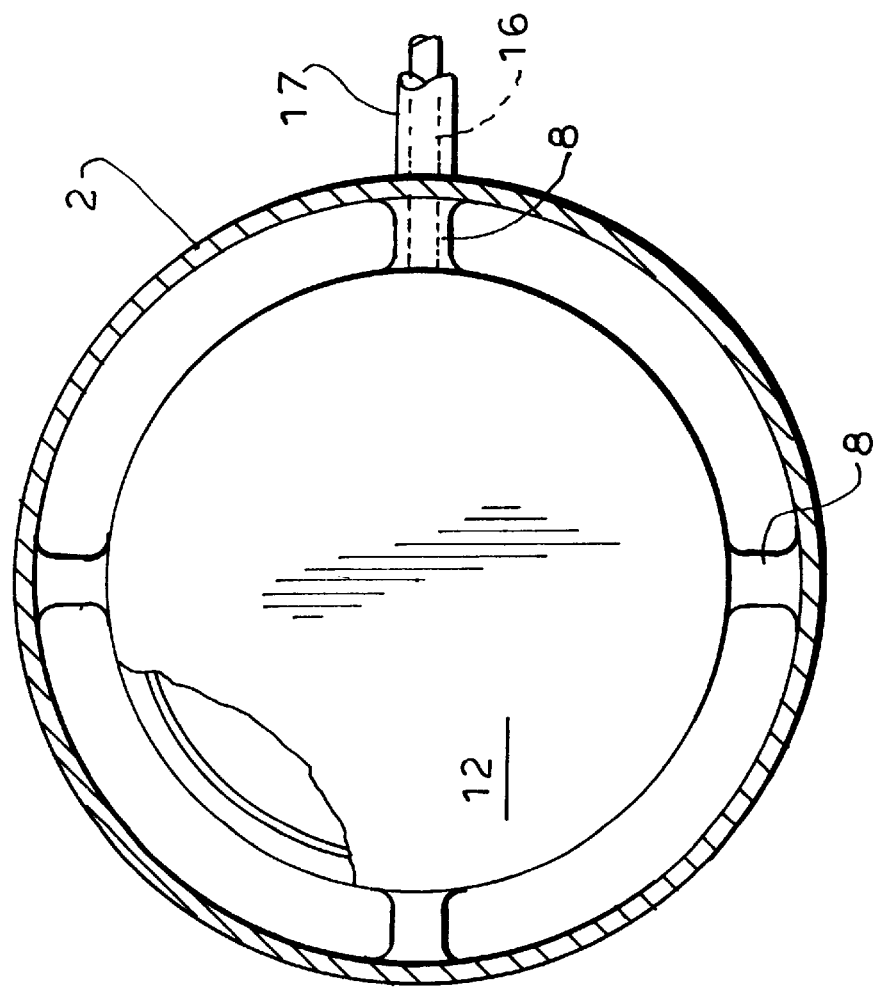
FIG. 2 is a cross sectional view along the line II—II of FIG. 1, partly broken away.

The electronic motor 7 is formed as a canned motor with a cup shaped can 18 formed in one piece with the motor housing 13 and lining the inside of the stator 20 with its windings 19. The rotor 21 of the electric motor is disposed in the space surrounded by the can 18 and the bearings 22 are supported by the can and journal the shaft 9. As can be seen from FIG. 4, the pump 1 can be located in a surge tank 30 of a cooling system of an internal combustion engine and the discharge fitting 6 in that case is readily removable from the outlet fitting 31 of the surge tank 30. The coolant liquid can flow into the surge tank through the fitting 32. The pump, moreover, and electronic unit are all completely received within the tank 30 to insure cooling of the control unit 12.

From FIG. 3 it will be apparent that the pump can be provided as an in-line pump in the pipe 40 of a motor vehicle coolant circulation system for circulating coolant through an engine 41 and between that engine and the radiator 42 of the vehicle. The motor of the pump 1 is energized by the vehicle battery 43. In all cases, the circulated liquid is caused to pass around the motor and the electronic control circuitry to efficiently cool the latter.

We claim:

1. A centrifugal pump comprising:
   an elongated tubular pump housing formed with an intake fitting at one axial end and a discharge fitting at an opposite axial end;
   a pump impeller rotatable in said housing about an axis thereof for drawing a liquid in through said intake fitting, passing said liquid axially through said housing and discharging the liquid through said discharge fitting;
   an axially elongated electric motor wholly received in said housing between said intake fitting and said discharge fitting and flushed around by the liquid flowing between said intake fitting and said discharge fitting, said motor having a rotor rotatable about said axis and operatively connected to said impeller, a stator surrounding said rotor and provided with at least one winding, and a motor casing receiving said stator and spaced inwardly of said housing, whereby said liquid passes between said casing and said housing;
   an electronic control unit for controlling said motor, wholly received in said housing and flushed around by said liquid;
   a plurality of angularly spaced support ribs between said housing and said casing for supporting said casing in said housings and
   a single annular seal between said electronic control unit and said casing and sealing said casing against an interior of said housing.

2. The centrifugal pump defined in claim 1 wherein said electronic control unit is fitted onto said casing at an end thereof opposite said impeller.

3. The centrifugal pump defined in claim 2 wherein said casing is open at said end and said electronic control unit is a plug which closes said end of said end of said casing.

4. The centrifugal pump defined in claim 1 wherein said motor is a canned motor.

5. The centrifugal pump defined in claim 4 wherein said casing is formed in one piece with a can internally lining said stator and surrounding said rotor, said can having bearings journalling a shaft carrying said rotor and said impeller.

6. The centrifugal pump defined in claim 1, further comprising an electric cable connected to said electronic control unit and extending through one of said ribs.

7. The centrifugal pump defined in claim 1, further comprising means for connecting said pump in a motor vehicle coolant circulation path.

8. The centrifugal pump defined in claim 7 wherein said housing forms part of a duct of said coolant circulation path so that said impeller, said motor and said electronic control unit are located wholly within said duct.

9. The centrifugal pump defined in claim 7 wherein said pump is located in a vessel forming part of said coolant circulation path.

10. The centrifugal pump defined in claim 9 wherein said pump is disposed in a surge tank.

11. A centrifugal pump comprising:
- an elongated tubular pump housing formed with an intake fitting at one axial end and a discharge fitting at an opposite axial end;
- a pump impeller rotatable in said housing about an axis thereof for drawing a liquid in through said intake fitting, passing said liquid axially through said housing and discharging the liquid through said discharge fitting;
- an axially elongated electric motor wholly received in said housing between said intake fitting and said discharge fitting and flushed around by the liquid flowing between said intake fitting and said discharge fitting, said motor having a rotor rotatable about said axis and operatively connected to said impeller, a stator surrounding said rotor and provided with at least one winding, and a motor casing receiving said stator and spaced inwardly of said housing, whereby said liquid passes between said casing and said housing;
- an electronic control unit for controlling said motor, wholly received in said housing and flushed around by said liquid;
- a plurality of angularly spaced support ribs between said housing and said casing for supporting said casing in said housing; and
- a single annular seal between said electronic control unit and said casing and sealing said casing against an interior of said housing,
- said motor being a canned motor,
- said casing being formed in one piece with a can internally lining said stator and surrounding said rotor, said can having bearings journalling a shaft carrying said rotor and said impeller, said electronic control unit being in the form of a plug fitting into said housing.

* * * * *